(12) United States Patent
Huang

(10) Patent No.: US 6,665,910 B2
(45) Date of Patent: Dec. 23, 2003

(54) MANUAL STRETCHER

(76) Inventor: Han-Ching Huang, No. 12, Alley 111, Lane 437, Ghen Hsing Road, Taichung (TW)

( * ) Notice: Subject to any disclaimer, the term of this patent is extended or adjusted under 35 U.S.C. 154(b) by 0 days.

(21) Appl. No.: 10/105,767

(22) Filed: Mar. 25, 2002

(65) Prior Publication Data

US 2003/0177581 A1 Sep. 25, 2003

(51) Int. Cl.$^7$ ............................................. B25B 25/00
(52) U.S. Cl. ..................................... 24/68 CD; 24/909
(58) Field of Search ............................. 24/68 CD, 909; 410/100, 12, 103, 104; 254/217, 218, 222, 223, 237

(56) References Cited

U.S. PATENT DOCUMENTS

| | | | | |
|---|---|---|---|---|
| 3,428,331 A | * | 2/1969 | Morgan et al. | 410/100 |
| 3,826,473 A | * | 7/1974 | Huber | 242/388.3 |
| RE30,307 E | * | 6/1980 | Arbogast | 410/37 |
| 4,268,012 A | * | 5/1981 | Ruehle et al. | 254/223 |
| 4,382,736 A | * | 5/1983 | Thomas | 410/104 |
| 4,475,854 A | * | 10/1984 | Ericsson | 410/103 |
| 5,282,296 A | * | 2/1994 | Huang | 24/68 CD |
| 5,291,638 A | * | 3/1994 | Huang | 24/170 |
| 5,369,848 A | * | 12/1994 | Huang | 24/68 CD |
| 5,443,342 A | * | 8/1995 | Huang | 410/151 |
| 5,560,086 A | * | 10/1996 | Huang | 24/68 CD |
| 5,778,496 A | * | 7/1998 | Huang | 24/68 CD |
| 5,819,377 A | * | 10/1998 | Huang | 24/68 CD |
| 5,890,856 A | * | 4/1999 | Huang | 410/151 |
| 5,894,638 A | * | 4/1999 | Huang | 24/68 CD |
| 5,943,742 A | * | 8/1999 | Huang | 24/68 CD |
| 5,947,666 A | * | 9/1999 | Huang | 410/151 |
| 5,975,455 A | * | 11/1999 | Alegre | 242/396.4 |
| 6,007,053 A | * | 12/1999 | Huang | 254/247 |
| 6,062,782 A | * | 5/2000 | Huang | 410/151 |
| 6,109,579 A | * | 8/2000 | Huang | 248/294.1 |
| 6,158,092 A | * | 12/2000 | Huang | 24/68 CD |
| 6,390,746 B1 | * | 5/2002 | Huang | 410/151 |
| 6,499,197 B1 | * | 12/2002 | Huang | 24/68 CD |

FOREIGN PATENT DOCUMENTS

| | | | | |
|---|---|---|---|---|
| EP | 246210 A2 | * | 11/1987 | B60P/7/08 |
| GB | 2161447 A | * | 1/1986 | B66D/1/36 |

* cited by examiner

Primary Examiner—James R. Brittain
(74) Attorney, Agent, or Firm—Alan Kamrath; Rider Bennett, LLP

(57) ABSTRACT

A manual stretcher includes a frame, a shaft, a ratchet, a claw, a joint and a crank. The frame includes two lateral plates, an intermediate plate interconnecting the lateral plates and a hole defined in each of the lateral plates. The frame can be attached to an external structure so that the manual stretcher can be retained in position in operation. The shaft includes a slot defined therein for receiving a portion of a strip of work to be stretched. The shaft is inserted trough the holes. The ratchet is mounted on an end of the shaft. The claw is pivotally mounted on one of the lateral plates of the frame for engagement with the ratchet. The joint is mounted on another end of the shaft for engagement with the crank for rotation of the shaft. The shaft includes two halves. The ratchet includes two meniscus holes defined therein for receiving the halves of the shaft. The joint includes two meniscus recesses defined in an end thereof for receiving the halves of the shaft. Each of the halves of the shaft may include a stop formed on an end thereof for abutting the ratchet. Each of the halves of the shaft includes a hole defined in an end thereof. The joint includes two opposite pin-receiving holes defined in a periphery thereof. A pin can be inserted in the holes defined in the halves of the shaft and the pin-receiving holes defined in the joint, thus securely mounting the joint on the halves of the shaft.

20 Claims, 5 Drawing Sheets

MANUAL STRETCHER

BACKGROUND OF THE INVENTION

1. Field of Invention

The present invention is related to a manual stretcher.

2. Related Prior Art

Referring to FIG. 5, a conventional manual stretcher includes a frame 1. The frame 1 includes a bracket (not numbered) formed thereon. The bracket can be securely attached to an external structure (not shown) so that the conventional manual stretcher can be retained in position in operation. The frame 1 includes two lateral plates. A hole 5 is defined in each of the lateral plates of the frame 1. A hollow shaft 4 is inserted through the holes 5. A slot is defined in the hollow shaft 4 for receiving a portion of a strip of work to be stretched (not shown). A ratchet 2 is soldered to an end of the hollow shaft 4 and a joint 3 is soldered to another end of the hollow shaft 4. A crank (not shown) can be inserted in two holes defined in the joint 3. Thus, the crank can be operated in order to rotate the hollow shaft 4 for stretching. Soldering causes roughness on the hollow shaft 4 Roughness prevents smooth rotation of the hollow shaft 4 on the frame 1. Grinding is often taken so as to eliminate such roughness. Thus, the difficulty in finishing is increased and time for fabrication is extended. Furthermore, soldering gives rise to flaws in structure and/or errors in dimension. In addition, points subject to soldering are vulnerable to concentration of stress and often become points of fracture.

The present invention is therefore intended to obviate or at least alleviate the problems encountered in fabrication and use of the above-mentioned conventional manual stretcher.

SUMMARY OF INVENTION

It is an objective of the present invention to provide a manual stretcher that can be fabricated precisely.

It is another objective of the present invention to provide a manual stretcher that can be fabricated easily.

It is another objective of the present invention to provide a manual stretcher that can be fabricated quickly.

It is another objective of the present invention to provide a manual stretcher that is strong in structure.

In the present invention, a manual stretcher includes a frame, a shaft, a ratchet, a claw, a joint and a crank. The frame includes two lateral plates, an intermediate plate interconnecting the lateral plates and a hole defined in each of the lateral plates. The frame can be attached to an external structure so that the manual stretcher can be retained in position in operation. The shaft includes a slot defined therein for receiving a portion of a strip of work to be stretched. The shaft is inserted through the holes. The ratchet is mounted on an end of the shaft. The claw is pivotally mounted on one of the lateral plates of the frame for engagement with the ratchet. The joint is mounted on another end of the shaft for engagement with the crank for rotation of the shaft.

The shaft may include two halves. The ratchet may include two meniscus holes defined therein for receiving the halves of the shaft. The joint may include two meniscus recesses defined in an end thereof for receiving the halves of the shaft.

Each of the halves of the shaft may include a stop formed on an end thereof for abutting the ratchet.

The stop formed on each of the halves of the shaft may be a curved ridge.

Each of the halves of the shaft may include a hole defined in an end thereof. The joint may include two opposite pin-receiving holes defined in a periphery thereof. A pin can be inserted in the holes defined in the halves of the shaft and the pin-receiving holes defined in the joint, thus securely mounting the joint on the halves of the shaft.

The joint may include a partition separating the meniscus recesses from each other. A pin-receiving hole may be defined in the partition of the joint.

The frame may include a bracket formed on the intermediate plate for attachment to the external structure.

The joint may include a number of crank-receiving holes defined in a periphery thereof for receiving the crank.

In an aspect of the present invention, the halves of the shaft are hollow. More particularly, each of the halves of the shaft is made of a metal strip by folding.

In another aspect of the present invention, the halves of the shaft are solid.

Other objectives, advantages, and novel features of the invention will become more apparent from the following detailed description when taken in conjunction with the attached drawings.

BRIEF DESCRIPTION OF DRAWINGS

The present invention is described through detailed illustration of embodiments referring to the attached drawings wherein.

DETAILED DESCRIPTION OF INVENTION

Figure 1:
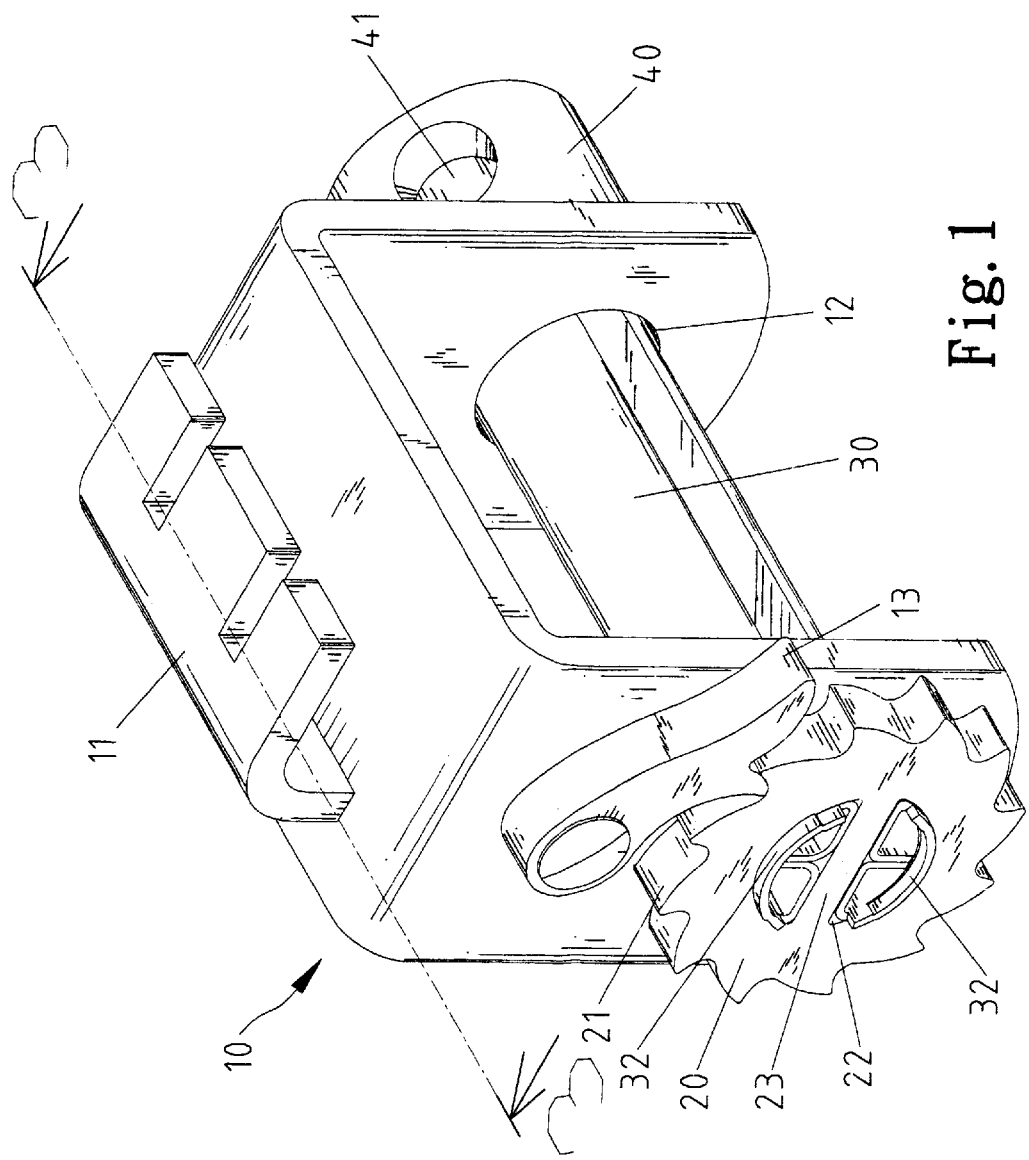
FIG. 1 is a perspective view of a manual stretcher according to the preferred embodiment of the present invention.

Referring to FIG. 1, according to the present invention, a manual stretcher includes a frame 10. The frame 10 includes two lateral plates and an intermediate plate interconnecting the lateral plates. The frame 10 includes a bracket 11 formed on the intermediate plate thereof. The bracket 11 can be securely attached to an external structure (not shown) so that the manual stretcher can be retained in position in operation. A hole 12 is defined in each of the lateral plates of the frame 10. A shaft 34 is inserted through the holes 12. A slot (not numbered) is defined in the shaft 34 for receiving a portion of a strip of work to be stretched (not shown). A ratchet 20 is mounted on an end of the shaft 34 and a joint 40 is mounted on another end of the shaft 34. A claw 13 is pivotally mounted on one of the lateral plates of the frame 10 for engagement with the ratchet 20. A crank (not shown) can be connected with the joint 40 and operated in order to rotate the shaft 34 for stretching.

Figure 2:
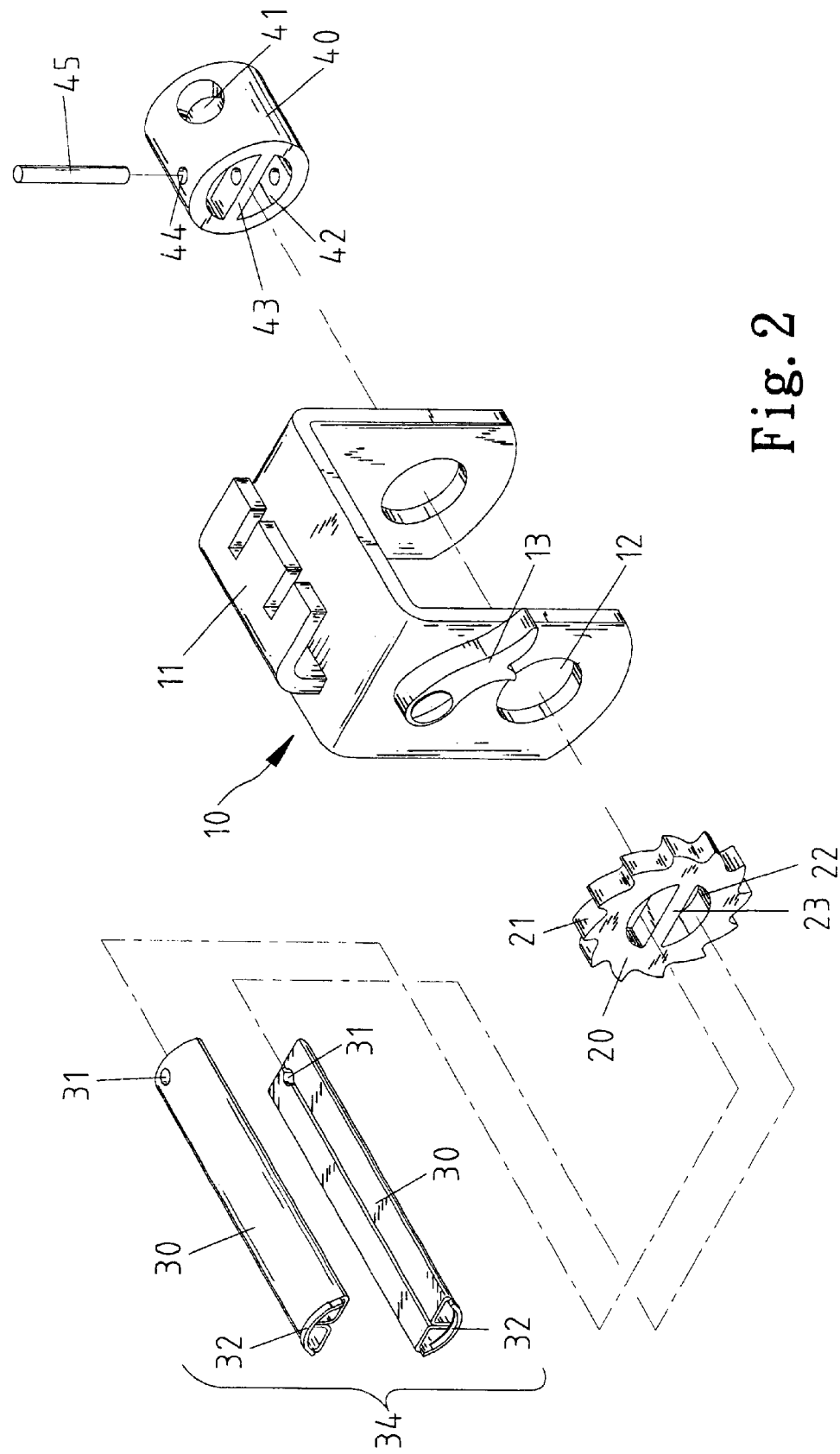
FIG. 2 is an exploded view of the manual stretcher shown in FIG. 1.
Figure 3:
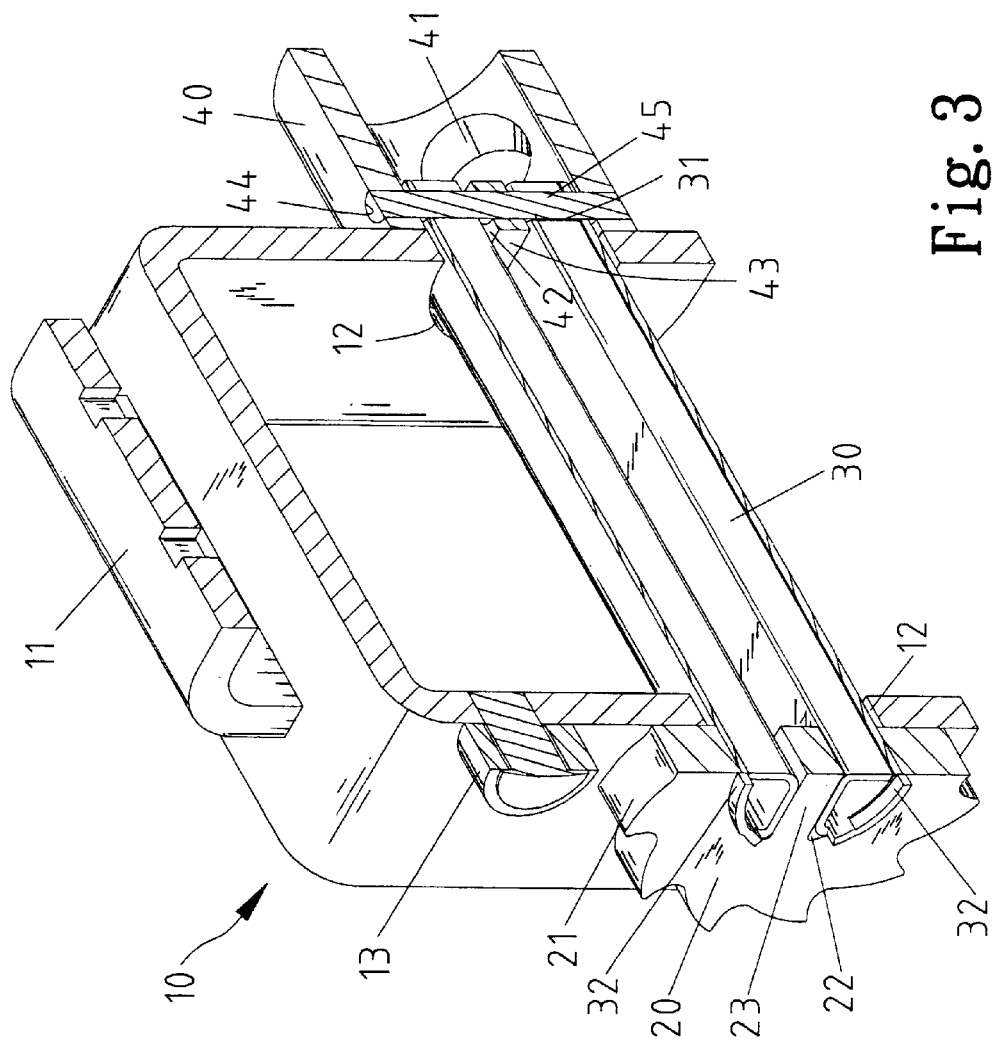
FIG. 3 is a cross-sectional view taken along a line 3—3 in FIG. 1.

Referring to FIGS. 2 and 3, the ratchet 20 includes a number of teeth 21 formed along a periphery thereof and two meniscus holes 22 defined therein. The meniscus holes 22 are separated from each other by means of a partition 23.

The shaft 34 includes two hollow halves 30. Each of the hollow halves 30 is made of a metal strip by folding. Each of the hollow halves 30 includes a hole 31 defined in a first end thereof and a stop 32 in the form of a curved ridge formed on a second end thereof.

The joint 40 includes a number of crank-receiving holes 41 defined in a periphery thereof, two meniscus recesses 42 defined in an end thereof. The meniscus recesses 42 are separated from each other by means of a partition 43. Two opposite pin-receiving holes 44 are defined in the periphery of the joint 40. Another pin-receiving hole 44 is defined in the partition 43.

In assembly, each of the hollow halves 30 is inserted in one of the meniscus holes 22. The hollow halves 30 are inserted in the holes 12 until the stops 32 abut the ratchet 20 that in turn abuts one of the lateral plates of the frame 10. The first end of each of the hollow halves 30 is beyond the frame 10. A pin 45 is inserted in pin-receiving holes 44 and the holes 31, thus securely mounting the joint 40 on the hollow halves 30.

In operation, a portion of a strip of work to be stretched (not shown) is positioned between the hollow halves 30. The crank can be inserted in two of the crank-receiving holes 41 and pivoted so as to rotate the hollow halves 30, thus stretching the strip of work.

Figure 4:
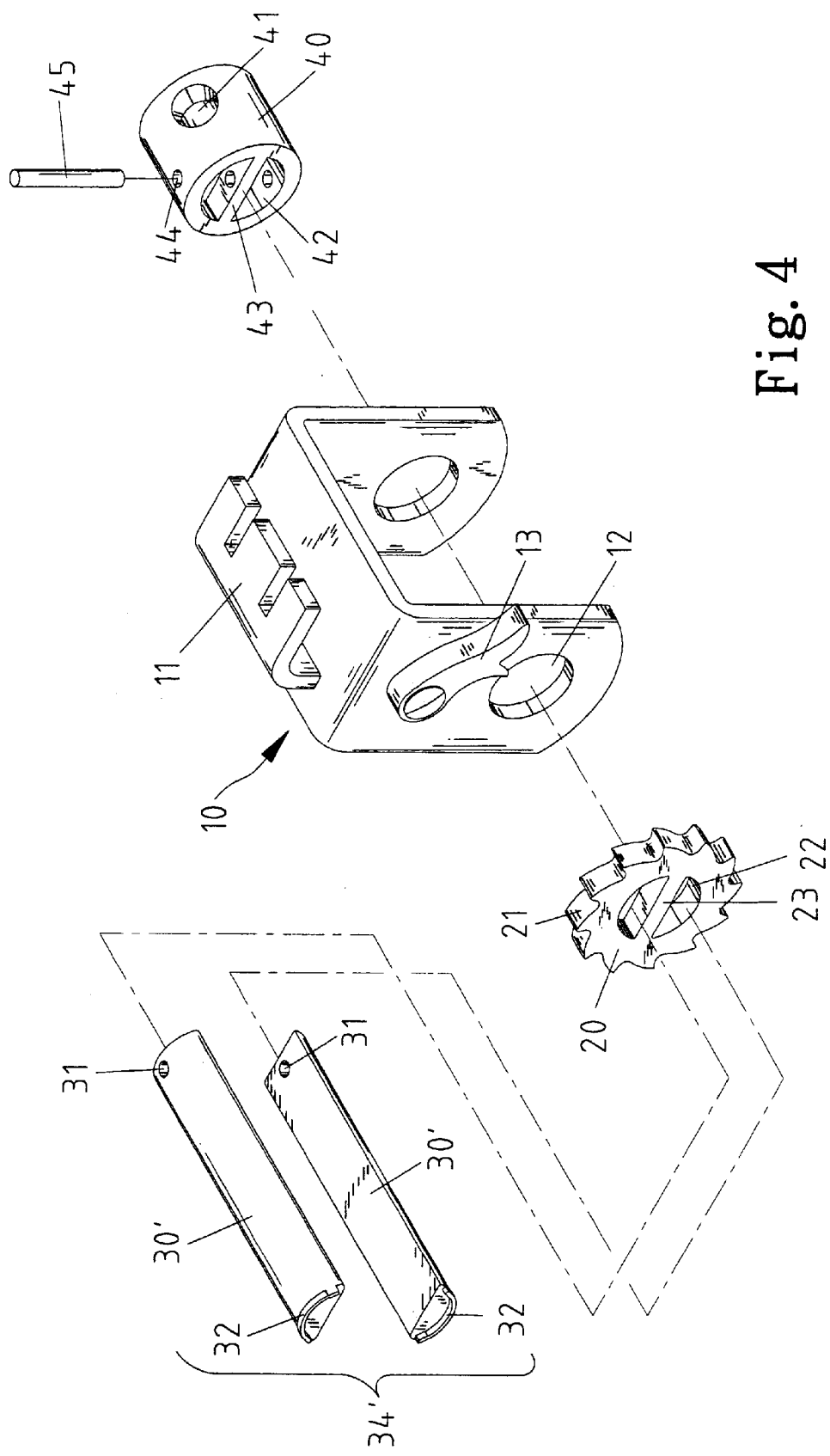
FIG. 4 is an exploded view of a manual stretcher according to a second embodiment of the present invention.
Figure 5:
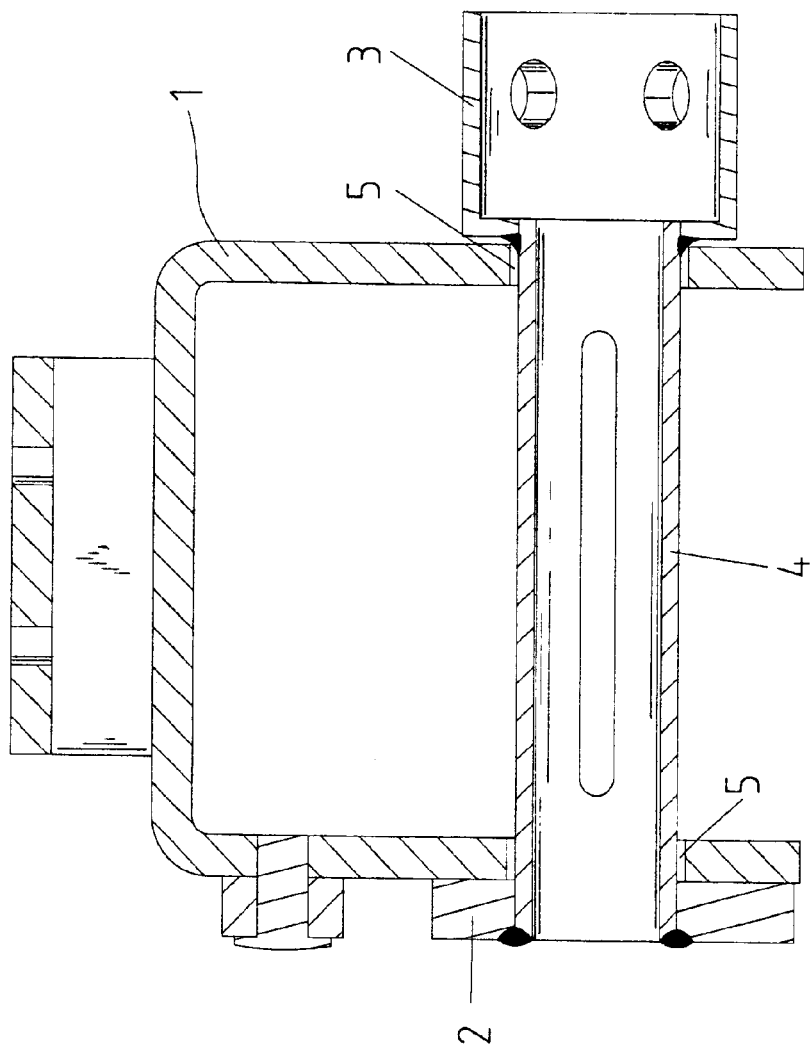
FIG. 5 is a cross-sectional view of a conventional manual stretcher.

Referring to FIG. 4, according to a second embodiment of the present invention, a manual stretcher includes a frame 10, a ratchet 20, a shaft 34' and a joint 40. The second embodiment is identical to the first embodiment except for including a shaft 34' instead of the shaft 34. The shaft 34' is identical to the shaft 34 except for including two solid halves 30' instead of two hollow halves 30.

The preferred embodiment of the present invention has been described in detail for purposes of illustration. Those skilled in the art can derive a lot of variations from these embodiments after a study of this patent specification. Therefore, these embodiments shall by no means limit the scope of the present invention. The scope of the present invention can only be defined in the claims attached to and taken as a portion of this patent specification.

What is claimed is:

1. A manual stretcher including:

a frame including two lateral plates, an intermediate plate connecting the lateral plates with each other and a hole defined in each of the lateral plates;

a shaft including a slot defined therein for receiving a portion of a strip of work, wherein the shaft is inserted through the holes;

a ratchet mounted on an end of the shaft;

a claw mounted on one of the lateral plates of the frame for engagement with the ratchet; and a joint mounted on another end of the shaft for engagement with a crank for rotation of the shaft, wherein the shaft includes two halves, wherein the joint includes two meniscus recesses defined in an end thereof for receiving the halves of the shaft, wherein each of the halves of the shaft includes a hole defined in an end thereof, wherein the joint includes two opposite pin-receiving holes defined in a periphery thereof, wherein a pin can be inserted in the boles defined in the halves of the shaft and the pin-receiving holes defined in the joint, thus securely mounting the joint on the halves of the shaft, wherein the joint includes a partition separating the meniscus recesses from each other, and wherein the partition includes a pin-receiving hole defined therein.

2. The manual stretcher according to claim 1 wherein the frame can be attached to an external structure so that the manual stretcher can be retained in position in operation; with the claw pivotally mounted on one of the lateral plates of the frame for engagement with the ratchet.

3. The manual stretcher according to claim 2 wherein the ratchet includes two meniscus holes defined therein for receiving the halves of the shaft.

4. The manual stretcher according to claim 3 wherein each of the halves of the shaft includes a stop formed on an end thereof for abutting the ratchet.

5. The manual stretcher according to claim 4 wherein the stop formed on each of the halves of the shaft is a curved ridge.

6. The manual stretcher according to claim 3 wherein each of the halves of the shaft is hollow.

7. The manual stretcher according to claim 6 wherein each of the halves of the shaft is made of a metal strip by folding.

8. The manual stretcher according to claim 3 wherein each of the halves of the shaft is solid.

9. The manual stretcher according to claim 2 wherein the frame includes a bracket formed on the intermediate plate for attachment to the external structure.

10. The manual stretcher according to claim 2 wherein the joint includes a number of crank-receiving holes defined in a periphery thereof for receiving the crank.

11. The manual stretcher according to claim 2 wherein each of the halves of the shaft includes a stop formed on an end thereof for abutting the ratchet.

12. The manual stretcher according to claim 11 wherein the stop formed on each of the halves of the shaft is a curved ridge.

13. The manual stretcher according to claim 1 wherein the frame includes a bracket formed on the intermediate plate for attachment to an external structure.

14. The manual stretcher according to claim 1 wherein the joint includes a number of crank-receiving holes defined in a periphery thereof for receiving the crank.

15. The manual stretcher according to claim 1 wherein each of the halves of the shaft is hollow.

16. The manual stretcher according to claim 15 wherein each of the halves of the shaft is made of a metal strip by folding.

17. The manual stretcher according to claim 1 wherein each of the halves of the shaft is solid.

18. The manual stretcher according to claim 1 wherein each of the halves of the shaft includes a stop formed on an end thereof for abutting the ratchet.

19. The manual stretcher according to claim 18 wherein the stop formed on each of the halves of the shaft is a curved ridge.

20. The manual stretcher according to claim 1 wherein the ratchet includes two meniscus holes defined therein for receiving the halves of the shaft.

\* \* \* \* \*